US009340631B2

(12) United States Patent
Willocq et al.

(10) Patent No.: US 9,340,631 B2
(45) Date of Patent: May 17, 2016

(54) PROCESS FOR PREPARING A POLYETHYLENE RESIN

(71) Applicant: TOTAL RESEARCH & TECHNOLOGY FELUY, Seneffe (BE)

(72) Inventors: Christopher Willocq, Bousval (BE); Daniel Siraux, Naast (BE); Aurélien Vantomme, Bois-de-Villers (BE); Olivier Miserque, Mont-Saint-Guibert (BE)

(73) Assignee: Total Research & Technology Feluy, Seneffe (BE)

( * ) Notice: Subject to any disclaimer, the term of this patent is extended or adjusted under 35 U.S.C. 154(b) by 0 days.

(21) Appl. No.: 14/417,530

(22) PCT Filed: Jul. 24, 2013

(86) PCT No.: PCT/EP2013/065562
§ 371 (c)(1),
(2) Date: Jan. 26, 2015

(87) PCT Pub. No.: WO2014/016318
PCT Pub. Date: Jan. 30, 2014

(65) Prior Publication Data
US 2015/0239999 A1    Aug. 27, 2015

(30) Foreign Application Priority Data

Jul. 27, 2012  (EP) .................................... 12178374

(51) Int. Cl.
*C08F 4/02*       (2006.01)
*C08F 4/6592*     (2006.01)
*C08F 210/16*     (2006.01)
*C08L 23/08*      (2006.01)
*C08F 110/02*     (2006.01)
*C08L 23/06*      (2006.01)
*C08F 4/659*      (2006.01)

(52) U.S. Cl.
CPC .................. *C08F 110/02* (2013.01); *C08F 4/02* (2013.01); *C08F 210/16* (2013.01); *C08L 23/06* (2013.01); *C08F 4/65912* (2013.01); *C08L 23/0815* (2013.01)

(58) Field of Classification Search
CPC ........ C08F 2/001; C08F 4/02; C08F 4/65912; C08F 4/65916; C08F 4/65927; C08F 210/16; C08L 23/0815
See application file for complete search history.

(56) References Cited

FOREIGN PATENT DOCUMENTS

WO    2011/073364 A1    6/2011

OTHER PUBLICATIONS

International Search Report issued in PCT/EP2013/065562 dated Nov. 21, 2013 (3 pages).

*Primary Examiner* — Caixia Lu
(74) *Attorney, Agent, or Firm* — Albert Shung

(57) ABSTRACT

A process for preparing a polyethylene resin having a multimodal molecular weight distribution in at least two loop slurry reactors connected in series can include polymerizing ethylene in the presence of at least one supported metallocene catalyst, a diluent, optionally one or more co-monomers, and optionally hydrogen, thereby obtaining the polyethylene resin. The supported metallocene catalyst can have a particle size distribution of a span value lower than 2.5 and a D50 value within the range of from 5 μm to 20 μm.

20 Claims, No Drawings

PROCESS FOR PREPARING A POLYETHYLENE RESIN

CROSS REFERENCE TO RELATED APPLICATIONS

This application is a National Stage Entry of PCT/EP2013/065562, filed on Jul. 24, 2013, which claims priority from European Application No. 12178374.0, filed on Jul. 27, 2012.

TECHNICAL FIELD OF THE INVENTION

The invention is in the field of polymers technology. In particular, the present invention relates to a process for preparing a polyethylene resin.

BACKGROUND OF THE INVENTION

Polyethylene (PE) is synthesized by polymerizing ethylene ($CH_2=CH_2$) monomers. Because it is cheap, safe, stable to most environments and easy to be processed, polyethylene polymers are useful in many applications. According to the properties, polyethylene can be classified into several types, such as but not limited to LDPE (Low Density Polyethylene). In another classification, the used polyethylene can be classified as Ultra High Molecular Weight (UHMW), High Molecular Weight (HMW), Medium Molecular Weight (MMW) and Low Molecular Weight (LMW). Each type of polyethylene has different properties and characteristics.

Ethylene polymerization processes are frequently carried out in a loop reactor using ethylene monomer, liquid diluent and catalyst, optionally one or more co-monomer(s), optionally an activating agent or co-catalyst and optionally hydrogen. The polymerization in a loop reactor is usually performed under slurry conditions, with the produced polymer usually in the form of solid particles which are suspended in the diluent. The slurry in the reactor is circulated continuously with a pump to maintain efficient suspension of the polymer solid particles in the liquid diluent. Polymer slurry is discharged from the loop reactor by means of settling legs, which operate on a batch principle to recover the slurry. Settling in the legs is used to increase the solids concentration of the slurry finally recovered as product slurry. The product slurry is further discharged through heated flash lines to a flash tank, where most of the diluent and unreacted monomers are flashed off and recycled.

After the polymer product is collected from the reactor and the hydrocarbon residues are removed, the polymer product is dried, additives can be added and finally the polymer may be mixed and pelletized. The resulting product can then be used for the manufacturing of various objects.

Polyethylene having high molecular weight is known to have good toughness, strength and environmental stress cracking resistance (ESCR). Consequently, there is a strong demand for high molecular weight polyethylene.

SUMMARY OF THE INVENTION

The present inventors have now found that polymerizing ethylene in the presence of a supported metallocene catalyst with a particle size distribution of a span value lower than 2.5 and with a D50 value ranging of from 5 µm to 20 µm allows preparing polyethylene having increased homogeneity.

The present invention therefore relates to a process for preparing a polyethylene resin having a multimodal molecular weight distribution in at least two slurry loop reactors connected in series, comprising the step of: polymerizing ethylene in the presence of at least one supported metallocene catalyst, a diluent, optionally one or more co-monomers, and optionally hydrogen, thereby obtaining the polyethylene resin, wherein the supported metallocene catalyst has a particle size distribution of a span value lower than 2.5 and a D50 value within the range of from 5 µm to 20 µm, wherein the span is defined as:

$$\text{span} = \frac{D90 - D10}{D50}$$

with D90 being defined as the particle size for which ninety percent by weight of the particles has a size lower than the D90;

with D10 being defined as the particle size for which ten percent by weight of the particles has a size lower than the D10;

with D50 being defined as the particle size for which fifty percent by weight of the particles has a size lower than the D50; and with the D90, D10 and D50 being measured by laser diffraction analysis on a Malvern type analyzer.

Surprisingly, the present invention leads to better controlled process conditions, homogeneous polyethylene products and/or more optimal end-products.

The present invention will now be further described. In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

DETAILED DESCRIPTION OF THE INVENTION

Before the present method used in the invention is described, it is to be understood that this invention is not limited to particular methods, components, or devices described, as such methods, components, and devices may, of course, vary. It is also to be understood that the terminology used herein is not intended to be limiting, since the scope of the present invention will be limited only by the appended claims.

When describing the processes of the invention, the terms used are to be construed in accordance with the following definitions, unless a context dictates otherwise.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps. The terms "comprising", "comprises" and "comprised of" also include the term "consisting of".

The recitation of numerical ranges by endpoints includes all numbers and fractions subsumed within the respective ranges, as well as the recited endpoints.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Unless otherwise defined, all terms used in disclosing the invention, including technical and scientific terms, have the meaning as commonly understood by one of ordinary skill in the art to which this invention belongs. By means of further guidance, definitions for the terms used in the description are included to better appreciate the teaching of the present invention.

The present invention encompasses a process for preparing a polyethylene resin having a multimodal molecular weight distribution in at least two loop reactors connected in series, under slurry conditions, comprising the step of: polymerizing ethylene in the presence of at least one supported metallocene catalyst, a diluent, optionally one or more co-monomers, and optionally hydrogen, thereby obtaining said polyethylene resin, wherein the at least one supported metallocene catalyst comprises a bridged bis-indenyl catalyst and/or a bridged bis-tetrahydrogenated indenyl catalyst and wherein the at least one supported metallocene catalyst has a particle size distribution of a span value $$\left(\text{span} = \frac{D90 - D10}{D50}\right)$$

lower than 2.5 and a D50 value ranging of from 5 μm to 20 μm.

As used herein, the term "catalyst" refers to a substance that causes a change in the rate of a polymerization reaction. In the present invention, it is especially applicable to catalysts suitable for the polymerization of ethylene to polyethylene. The present invention especially relates to metallocene catalysts, in particular to supported metallocene catalysts.

Preferably, the metallocene catalyst is a bridged bis-indenyl catalyst and/or a bridged bis-tetrahydrogenated indenyl catalyst.

As used herein, the term "bridged" metallocene refers to a metallocene in which the two aromatic transition metal ligands, i.e. the two indenyl or tetrahydroindenyl groups, are covalently linked or connected by means of a structural bridge. Such structural bridge imparts stereorigidity on the metallocene, i.e. the free movement of the metal ligands is restricted. In an embodiment, the bridged metallocene consists of a meso or racemic stereoisomer.

In an embodiment, the metallocene catalyst is a compound of formula (I) or (II):

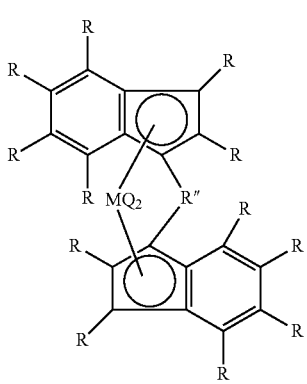

(I)

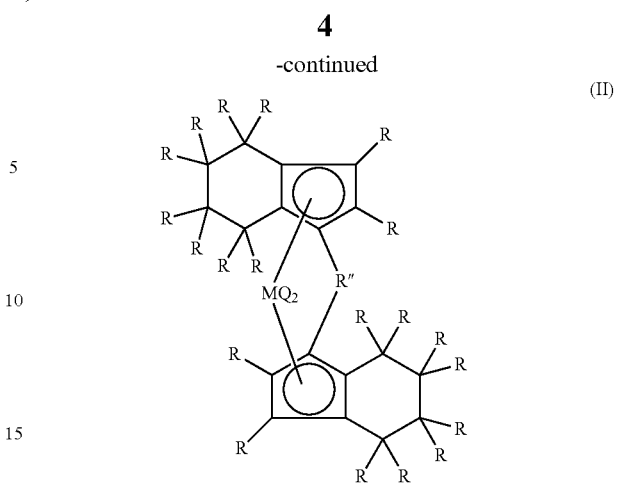

(II)

wherein
each R is the same or different and is selected independently from hydrogen or XR'v in which X is chosen from Group 14 of the Periodic Table (preferably carbon), oxygen or nitrogen and each R' is the same or different and is chosen from hydrogen or a hydrocarbyl of from 1 to 20 carbon atoms and v+1 is the valence of X, preferably R is a hydrogen, methyl, ethyl, n-propyl, iso-propyl, n-butyl, tert-butyl group;

R" is a structural bridge between the two indenyl or tetrahydrogenated indenyls to impart stereorigidity that comprises a C1-C4 alkylene radical, a dialkyl germanium, silicon or siloxane, or an alkyl phosphine or amine radical;

Q is a hydrocarbyl radical having from 1 to 20 carbon atoms or a halogen, preferably Q is F, Cl, or Br; and M is a transition metal Group 4 of the Periodic Table or vanadium.

Each indenyl or tetrahydro indenyl component may be substituted with R in the same way or differently from one another at one or more positions of either of the fused rings. Each substituent is independently chosen.

If the cyclopentadienyl ring is substituted, its substituent groups must not be so bulky so as to affect coordination of the olefin monomer to the metal M. Any substituents XR'v on the cyclopentadienyl ring are preferably methyl. More preferably, at least one and most preferably both cyclopentadienyl rings are unsubstituted.

In certain embodiments, the at least one supported metallocene catalyst may be a bridged unsubstituted bis-indenyl and/or a bridged unsubstituted bis-tetrahydrogenated indenyl. For example, the at least one supported metallocene catalyst may be a bridged unsubstituted bis-indenyl, a bridged unsubstituted bis-tetrahydrogenated indenyl, or a bridged unsubstituted bis-indenyl and a bridged unsubstituted bis-tetrahydrogenated indenyl. In a particularly preferred embodiment, the metallocene comprises a bridged unsubstituted bis-indenyl and/or bis-tetrahydrogenated indenyl i.e. all R are hydrogens. More preferably, the metallocene comprises a bridged unsubstituted bis-tetrahydrogenated indenyl.

Preferably, the at least one supported metallocene catalyst is a bridged unsubstituted bis-tetrahydrogenated indenyl.

In a preferred embodiment, the at least one supported metallocene catalyst is ethylene-bis(tetrahydroindenyl)zirconium dichloride or ethylene-bis(tetrahydroindenyl) zirconium difluoride.

In an embodiment, the at least one supported metallocene catalyst may have a particle size distribution of a span value $$\left(\text{span} = \frac{D90 - D10}{D50}\right)$$

lower than 2.5, preferably lower than 1.9, more preferably lower than 1.5, even more preferably lower than 1.0, yet more preferably lower than 0.90.

In an embodiment, the at least one supported metallocene catalyst may have a D50 value within the range of from 5 μm to 20 μm, preferably, within the range of from 5 μm to 15 μm, more preferably, within the range of from 7.5 μm to 15 μm.

Preferably, the supported metallocene catalyst comprises a bridged bis-indenyl catalyst and/or a bridged bis-tetrahydrogenated indenyl catalyst and has a particle size distribution of a span value lower than 1.9 and a D50 value within the range of from 5 μm to 15 μm.

Supported metallocene catalyst with such particle size distribution, i.e. span value, and particle size, i.e. D50, allow preparing polyethylene with increased homogeneity.

The metallocene catalysts used herein are provided on a solid support. The support can be an inert organic or inorganic solid, which is chemically unreactive with any of the components of the conventional metallocene catalyst. Suitable support materials for the supported catalyst include solid inorganic oxides, such as silica, alumina, magnesium oxide, titanium oxide, thorium oxide, as well as mixed oxides of silica and one or more Group 2 or 13 metal oxides, such as silica-magnesia and silica-alumina mixed oxides. Silica, alumina, and mixed oxides of silica and one or more Group 2 or 13 metal oxides are preferred support materials. Preferred examples of such mixed oxides are the silica-aluminas. Most preferred is a silica compound. In a preferred embodiment, the metallocene catalyst is provided on a solid support, preferably a silica support. The silica may be in granular, agglomerated, fumed, or any other form.

In an embodiment, the support of the supported catalyst is a porous support, and preferably a porous silica support having a surface area comprised between 200 and 900 m²/g. Preferably, the porous silica support has an average pore volume comprised between 0.5 and 4 ml/g, and preferably between 1 and 2 ml/g. Preferably, the porous silica support has an average pore diameter comprised between 50 and 300 Å, and preferably between 75 and 220 Å.

According to the invention, the silica support has a span $$\left(\text{span} = \frac{D90 - D10}{D50}\right)$$

lower than 2.5, preferably lower than 1.9, more preferably lower than 1.5, even more preferably lower than 1.0, yet more preferably lower than 0.90; and a D50 value within the range of from 5 μm to 20 μm.

Preferably, the supported metallocene catalyst is activated with a cocatalyst. The cocatalyst, which activates the metallocene catalyst component, can be any cocatalyst known for this purpose such as an aluminium-containing cocatalyst, a boron-containing cocatalyst or a fluorinated catalyst. The aluminium-containing cocatalyst may comprise an alumoxane, an alkyl aluminium, a Lewis acid and/or a fluorinated catalytic support.

In an embodiment, alumoxane is used as an activating agent for the metallocene catalyst. The alumoxane can be used in conjunction with a catalyst in order to improve the activity of the catalyst during the polymerization reaction.

As used herein, the term "alumoxane" and "aluminoxane" are used interchangeably, and refer to a substance, which is capable of activating the metallocene catalyst. In an embodiment, alumoxanes comprise oligomeric linear and/or cyclic alkyl alumoxanes. In a further embodiment, the alumoxane has formula (III) or (IV)

$R^1$—(Al($R^a$)—O)$_x$—Al$R^a{}_2$ (III) for oligomeric, linear alumoxanes; or (—Al($R^a$)—O—)$_y$ (IV) for oligomeric, cyclic alumoxanes wherein x is 1-40, and preferably 10-20;
wherein y is 3-40, and preferably 3-20; and
wherein each $R^a$ is independently selected from a $C_1$-$C_8$alkyl, and preferably is methyl.

In a preferred embodiment, the alumoxane is methylalumoxane (MAO).

In a preferred embodiment, the supported metallocene catalyst is a supported metallocene-alumoxane catalyst comprising a metallocene and an alumoxane which are bound on a porous silica support.

In an embodiment, the at least one supported metallocene catalyst is a supported metallocene-alumoxane catalyst comprising a metallocene and an alumoxane which are provided on a silica support having a span $$\left(\text{span} = \frac{D90 - D10}{D50}\right)$$

lower than 2.5, preferably lower than 1.9, more preferably lower than 1.5, even more preferably lower than 1.0, yet more preferably lower than 0.90.

In an embodiment, the supported metallocene catalyst is a supported metallocene-alumoxane catalyst comprising a metallocene and an alumoxane which are provided on a silica support having a D50 value within the range of from 5 μm to 20 μm, preferably, within the range of from 5 μm to 15 μm, more preferably, within the range of from 7.5 μm to 15 μm.

Preferably, the present invention relates to a process for preparing a polyethylene resin having a multimodal molecular weight distribution in at least two loop reactors connected in series, under slurry conditions, comprising the step of: polymerizing ethylene in the presence of at least one supported metallocene catalyst, a diluent, optionally one or more co-monomers, and optionally hydrogen, thereby obtaining said polyethylene resin, wherein the metallocene catalyst is a bridged bis-indenyl catalyst and/or a bridged bis-tetrahydrogenated indenyl catalyst and wherein the at least one supported metallocene catalyst is a supported metallocene-alumoxane catalyst comprising a metallocene and an alumoxane which are provided on a silica support having a span lower than 1.9 and having a D50 value within the range of from 5 μm to 15 μm.

The D90 is defined as the particle size for which ninety percent by weight of the particles has a size lower than the D90.

The D10 is defined as the particle size for which ten percent by weight of the particles has a size lower than the D10.

The D50 is defined as the particle size for which fifty percent by weight of the particles has a size lower than the D50.

The measurement of the particle size can be made according to the International Standard ISO 13320:2009 ("Particle size analysis—Laser diffraction methods").

For example, the D90, D50, and D10 can be measured by sieving, by BET surface measurement, or by laser diffraction analysis. For example, Malvern Instruments' laser diffraction systems may advantageously be used. The particle size may be measured by laser diffraction analysis on a Malvern type analyzer. The particle size may be measured by laser diffraction analysis on a Malvern type analyzer after having put the supported catalyst in suspension in cyclohexane. Suitable Malvern systems include the Malvern 2000, Malvern MasterSizer (such as Mastersizer S), Malvern 2600 and Malvern 3600 series. Such instruments together with their operating manual meet or even exceed the requirements set-out within the ISO 13320 Standard. The Malvern MasterSizer (such as Mastersizer S) may also be useful as it can more accurately measure the D50 towards the lower end of the range e.g. for average particle sizes of less 8 μm, by applying the theory of Mie, using appropriate optical means.

Non-limiting example of suitable silica support, having a span value lower than 2.5 and a D50 value within the range of from 5 μm to 20 μm, can be for example silica support sold by Azahi under the name H121C having an D50 of about 15 μm, or silica support sold by PQ under the name PD-10001 having a D50 of about 12.5 μm.

Metallocene methylaluminoxane(MAO)-supported silica can be prepared as described below:

Silica gel (for example Asahi Glass Sunsphere H-121C) can be dried in an oven at 450° C. for several hours. Dried silica is then placed in dry deoxygenated toluene. The slurry can be briefly agitated and MAO in toluene (for example 30 wt %) is added. The reaction mixture can be heated to 115° C. and allowed to reflux for few hours. The slurry is allowed to cool to room temperature and filtered. Wet product is washed sequentially with one or more portions of toluene and pentane. The MAO on silica is then dried in vacuo. Ethylene-bis (tetrahydroindenyl)zirconium dichloride can be slurried into toluene. The metallocene slurry is added to a stirred solution of the MAO on silica. The solids are allowed to filter. The wet supported catalyst is washed with one or more portions of toluene and pentane. Final catalyst is dried under reduced pressure.

The present invention encompasses producing a polyethylene resin. In an embodiment, the polyethylene resin may be produced in at least two loop reactors connected in series, wherein each loop reactor preferably comprises interconnected pipes, defining a reactor path, and wherein a polymerization slurry is preferably pumped through the loop reactor.

As used herein, the term "polymerization slurry" or "polymer slurry" or "slurry" means substantially a multi-phase composition including at least polymer solids and a liquid phase, the liquid phase being the continuous phase. The solids include catalyst and a polymerized olefin, such as polyethylene. The liquids include an inert diluent, dissolved monomer such as ethylene, optionally one or more co-monomers, optionally molecular weight control agents, such as hydrogen, antistatic agents, antifouling agents, scavengers, and other process additives.

As used herein, the term "diluent" refers to diluents in a liquid state, liquid at room temperature and preferably liquid under the pressure conditions in the loop reactor. Diluents which are suitable for being used in accordance with the present invention may comprise but are not limited to hydrocarbon diluents such as aliphatic, cycloaliphatic and aromatic hydrocarbon solvents, or halogenated versions of such solvents. The preferred solvents are C12 or lower, straight chain or branched chain, saturated hydrocarbons, C5 to C9 saturated alicyclic or aromatic hydrocarbons or C2 to C6 halogenated hydrocarbons. Non-limiting illustrative examples of solvents are butane, isobutane, pentane, hexane, heptane, cyclopentane, cyclohexane, cycloheptane, methyl cyclopentane, methyl cyclohexane, isooctane, benzene, toluene, xylene, chloroform, chlorobenzenes, tetrachloroethylene, dichloroethane and trichloroethane. In a preferred embodiment of the present invention, said diluent is isobutane. However, it should be clear from the present invention that other diluents may as well be applied according to the present invention.

Suitable ethylene polymerization includes but is not limited to homopolymerization of ethylene, copolymerization of ethylene and one or more higher 1-olefin co-monomers.

As used herein, the term "co-monomer" refers to olefin co-monomers which are suitable for being polymerized with ethylene monomers. Co-monomers may comprise but are not limited to aliphatic C3-C20 alpha-olefins. Examples of suitable aliphatic C3-C20 alpha-olefins include propylene, 1-butene, 1-pentene, 4-methyl-1-pentene, 1-hexene, 1-octene, 1-decene, 1-dodecene, 1-tetradecene, 1-hexadecene, 1-octadecene and 1-eicosene. The term "co-polymer" refers to a polymer, which is made by linking two different types of in the same polymer chain. The term "homo-polymer" refers to a polymer which is made by linking ethylene monomers, in the absence of co-monomers. In an embodiment of the present invention, said co-monomer is 1-hexene.

In a preferred embodiment, reactants comprising the monomer ethylene, isobutane as hydrocarbon diluent, a supported metallocene catalyst, and optionally at least one co-monomer such as 1-hexene are used.

The polymerization may be performed over a wide temperature range. Preferably, the temperature is within the range of about 0° C. to about 110° C. A more preferred range is from about 60° C. to about 100° C., more preferably from about 80 to 110° C., The reactor pressure is preferably held ranging of from 20 to 100 bar, such as of from 30 to 50 bar, more preferably at pressure of from 37 to 45 bar. In an embodiment, the slurry flow can be set between 5 and 15 m/s.

In an embodiment of the present invention, the process may further comprise a prepolymerization step comprising contacting ethylene with the metallocene catalyst. In an embodiment, said pre-polymerization is performed in a loop reactor having a smaller size compared to the polymerization loop reactor.

For the purpose of this invention, "resin" or "fluff" is defined as the polymer material that is produced in the loop reactor.

In an embodiment of the present invention, the polyethylene resin has a multimodal molecular weight distribution.

In a preferred embodiment of the present invention, the polyethylene resin has a bimodal molecular weight distribution.

By the term "monomodal polyethylene" or "polyethylene with a monomodal molecular weight distribution" it is meant, polyethylene having one maxima in their molecular weight distribution curve defined also as unimodal distribution curve. By the term "polyethylene with a bimodal molecular weight distribution" or "bimodal polyethylene" it is meant, polyethylene having a distribution curve being the sum of two unimodal molecular weight distribution curves. By the term "polyethylene with a multimodal molecular weight distribution" or "multimodal" polyethylene product it is meant polyethylene with a distribution curve being the sum of at least two, preferably more than two unimodal distribution curves.

In an embodiment of the present invention, the polymerization is conducted in at least two loop reactors connected in series, i.e., at least one first loop reactor connected in series with at least one second loop reactor, wherein in the first loop reactor a polyethylene fraction is prepared having a MI105 ranging from 1 to 150 g/10 min, with the MI105 being measured by the procedure of ASTM D-1238 using a temperature of 190° C., a load of 2.16 kg and a die with the following features: diameter of 1.05 mm and height of 4 mm.

In an embodiment, the polyethylene resin has a High Load Melt Index (HLMI) ranging from 1 to 150 g/10 min, with the High Load Melt Index (HLMI) being measured by the procedure of ASTM D-1238 using a temperature of 190° C. and a load of 21.6 kg.

The present invention also encompasses formed articles comprising the polyethylene resin produced according to the present process. Due to the improved mechanical properties of the polyethylene of the invention, it is suitable for a wide variety of applications. Preferred articles are pipes, caps and closures, fibers, films, sheets, containers, foams, artificial grass, rotomoulded articles and injection molded articles. Most preferred articles are pipes and caps and closures.

The following non-limiting example illustrates the invention.

The present inventors have found that polyethylene resin produced according to the present process have an improved homogeneity. The process provides advantages such as ease of processing.

The following non-limiting example illustrates the invention.

EXAMPLES

Two bimodal polyethylene resins ER-1 and ER-2 and a comparative polyethylene resin were prepared in two serially connected loop reactors (double loop reactor) under the conditions as given below in Table 1. The comparative supported metallocene catalyst was tetrahydroindenyl (THI)-MAO supported catalyst, in particular ethylene-bis(tetrahydroindenyl) zirconium dichloride-MAO supported catalyst (THI/ES70W/MAO) The silica support was sold by PQ Corporation under the name ES70W. It had the following specifications: specific surface area=291 m$^2$/g. D50=40 μm; porous volume=1.63 ml/g; span=1.62.

The supported metallocene catalyst used for preparing ER1 and ER2 was tetrahydroindenyl (THI)-MAO supported catalyst, in particular ethylene-bis(tetrahydroindenyl)zirconium dichloride-MAO supported catalyst (THI/H121C/MAO) The silica support was sold by Azahi under the name H121C. It had the following specifications: specific surface area=747 m$^2$/g. D50=15 μm; porous volume=1.3 ml/g; span=1.16. The supported catalyst was prepared as described above in the detailed description.

Table 2 shows the characteristics of the polyethylene A-1 in comparison with the bimodal polyethylene resins, ER-1 and ER-2.

The molecular weight ($M_n$ (number average molecular weight), $M_w$ (weight average molecular weight) and $M_z$ (z-average molecular weight)) and molecular weight distributions d and d' were determined by size exclusion chromatography (SEC) and in particular by gel permeation chromatography (GPC). Briefly, a GPCV 2000 from Waters was used: 10 mg polyethylene sample was dissolved at 160° C. in 10 ml of trichlorobenzene for 1 hour. Injection volume: about 400 μl, automatic sample preparation and injection temperature: 160° C. Column temperature: 145° C. Detector temperature: 160° C. Two Shodex AT-806MS (Showa Denko) and one Styragel HT6E (Waters) columns were used with a flow rate of 1 ml/min. Detector: Infrared detector (2800-3000 cm-1). Calibration: narrow standards of polystyrene (PS) (commercially available). Calculation of molecular weight Mi of each fraction i of eluted polyethylene is based on the Mark-Houwink relation ($\log_{10}(M_{PE})$=0.965909–$\log_{10}(M_{PS})$–0.28264) (cut off on the low molecular weight end at $M_{PE}$=1000).

The molecular weight averages used in establishing molecular weight/property relationships are the number average ($M_n$), weight average ($M_w$) and z average ($M_z$) molecular weight. These averages are defined by the following expressions and are determined form the calculated $M_i$:

$$M_n = \frac{\sum_i N_i M_i}{\sum_i N_i} = \frac{\sum_i W_i}{\sum_i W_i/M_i} = \frac{\sum_i h_i}{\sum_i h_i/M_i}$$

$$M_w = \frac{\sum_i N_i M_i^2}{\sum_i N_i M_i} = \frac{\sum_i W_i M_i}{\sum_i M_i} = \frac{\sum_i h_i M_i}{\sum_i M_i}$$

$$M_z = \frac{\sum_i N_i M_i^3}{\sum_i N_i M_i^2} = \frac{\sum_i W_i M_i^2}{\sum_i W_i M_i} = \frac{\sum_i h_i M_i^2}{\sum_i h_i M_i}$$

Here $N_i$ and $W_i$ are the number and weight, respectively, of molecules having molecular weight Mi. The third representation in each case (farthest right) defines how one obtains these averages from SEC chromatograms. $h_i$ is the height (from baseline) of the SEC curve at the $i_{th}$ elution fraction and $M_i$ is the molecular weight of species eluting at this increment.

The gel content in a film was measured by the amount of gel defined as the portion of the film surface covered by gel expressed as part per million of surface covered with gel (ppm). The polyethylene was extruded on a small laboratory extruder to form pellets and the pellets were then extruded to produce films having a thickness of 50 microns. The gels absorb more light than the polyethylene film and they are thus detected above an absorption threshold, high absorption threshold meaning high detection sensitivity. The gel level was determined by sending a beam of light through the film and by measuring the light transmitted through said film with a digital camera. The equipment used was as follows:

The extruder to prepare the films was a Brabender E19/25D (table model) equipped with a 1.2 kW motor, a screw speed regulator of from 1 to 100 rpm, and three zones for temperature control of 1300 W each.

The light source was a halogen lamp DDL, cold light 150 W, 20 A equipped with an optical cross section converter.

The camera was a digital linear camera having a line length of 2048 pixels, each pixel having a dimension of 14 microns×14 microns, a dynamic range of 1000:1, a pixel frequency of 30 MHz, an inspection width of about 100 mm and a resolution of about 50 microns.

The image-processing unit was an Intel 586/133 MHz processor with a memory of 16Mb RAM, a hard disk of 1.6 Gb, a graphic monitor VGA high resolution, 1024×768, low radiation, a capacity of 12,000,000 pixels/sec.

TABLE 1

Polymerization conditions in the first and second reactor of bimodal polyethylene resins ER-1 and ER-2, and of a comparative polyethylene resin A-1.

| | | | A-1 | ER-1 | ER-2 |
|---|---|---|---|---|---|
| | Catalyst | | THI/ES70W/MAO | THI/H121C/MAO | THI/H121C/MAO |
| | D50 | | 41.2 μm | 15.0 μm | 15.0 μm |
| First reactor | Temperature | (° C.) | 95 | 95 | 95 |
| | C2 | (kg/h) | 26.2 | 27.0 | 25.5 |
| | Diluent | | isobutane | isobutane | isobutane |
| | Solids | (wt %) | 21.0 | 21.6 | 21.4 |

TABLE 1-continued

Polymerization conditions in the first and second reactor of bimodal polyethylene resins ER-1 and ER-2, and of a comparative polyethylene resin A-1.

| | | | A-1 | ER-1 | ER-2 |
|---|---|---|---|---|---|
| Second reactor | Contribution | (wt %) | 48.1 | 47.6 | 43.8 |
| | MI105 | (g/10 min) | 21.10 | 21.10 | 20.20 |
| | Density | (g/cm³) | 0.9727 | 0.9717 | 0.9725 |
| | Temperature | (° C.) | 90 | 90 | 80 |
| | C2 | (kg/h) | 24.5 | 24.5 | 30 |
| | C6 | (Kg/h) | 2.10 | 1.90 | 1.90 |
| | H2 | (Nl/h) | 9.5 | 7.2 | 0.0 |
| | Diluent | | isobutane | isobutane | isobutane |
| | Solids | (wt %) | 25.9 | 26.7 | 28.1 |
| | Productivity | (g/g) | 2047 | 2827 | 2552 |
| | MI2 | (gr/10 min) | 2.95 | 2.90 | — |
| | MI5 | (g/10 min) | 10.20 | 11.00 | 0.57 |
| | HLMI | (g/10 min) | 128.0 | 129.0 | 15.6 |
| | SR2 | | 43.4 | 44.5 | — |
| | SR5 | | 12.5 | 11.7 | 27.4 |
| | Density | (g/cm³) | 0.9525 | 0.9508 | 0.9459 |

TABLE 2

Physical properties of bimodal polyethylene resins ER-1 and ER-2, and of a comparative polyethylene resin A-1.

| | | | A-1 | ER-1 | ER-2 |
|---|---|---|---|---|---|
| PELLETS | MI2 | (g/10 min) | 2.37 | 1.90 | — |
| | MI5 | (g/10 min) | 7.90 | 6.40 | 0.25 |
| | HLMI | (g/10 min) | 85.1 | 70.0 | 5.3 |
| | SR2 | | 36 | 37 | — |
| | Density | (g/cm³) | 0.9521 | 0.9505 | 0.9462 |
| | Gels | ppm | 386 | 25 | 82 |
| FINAL FLUFF | Mn | (Da) | 15743 | 18148 | 20678 |
| | Mw | (Da) | 63439 | 66638 | 142477 |
| | Mz | (Da) | 151079 | 159842 | 463884 |
| | D | | 4.0 | 3.7 | 6.9 |
| | D' | | 2.4 | 2.4 | 3.3 |

Abbreviations:
MI105: melt index being measured by the procedure of ASTM D-1238 using a temperature of 190° C., a load of 2.16 kg and a die with the following features: diameter of 1.05 mm and height of 4 mm;
MI2: melt index being measured by the procedure of ASTM D-1238 using a temperature of 190° C. and a load of 2.16 kg;
MI5: melt index being measured by the procedure of ASTM D-1238 using a temperature of 190° C. and a load of 5 kg
HLMI: high load melt index being measured by the procedure of ASTM D-1238 using a temperature of 190° C. and a load of 21.6 kg;
SR2: HLMI/MI2;
SR5: HLMI/MI5;
density:
Mn: number average molar mass or number average molecular weight;
Mw: weight average molar mass or weight average molecular weight;
Mz: average molar mass or average molecular weight;
D = Mw/Mn;
D' = Mz/Mw;
D50: the particle size for which fifty percent by weight of the particles has a size lower than the D50;
FF: final fluff The present examples, shows that the polyethylene resins obtained with the present process have better homogeneity, as can be seen by the low levels of gels measured for these resins, compared to the comparative example.

The invention claimed is:

1. A process for preparing a polyethylene resin having a multimodal molecular weight distribution in at least two loop slurry reactors connected in series, comprising the step of:
polymerizing ethylene in the presence of at least one supported metallocene catalyst, a diluent, optionally one or more co-monomers, and optionally hydrogen, thereby obtaining the polyethylene resin, wherein the supported metallocene catalyst has a particle size distribution of a span value lower than 2.5 and a D50 value within the range of from 5 μm to 20 μm, wherein the span is defined as:

$$\text{span} = \frac{D90 - D10}{D50};$$

with D90 being defined as the particle size for which ninety percent by weight of the particles has a size lower than the D90;

with D10 being defined as the particle size for which ten percent by weight of the particles has a size lower than the D10;

with D50 being defined as the particle size for which fifty percent by weight of the particles has a size lower than the D50; and with the D90, D10 and D50 being measured by laser diffraction analysis on a Malvern type analyzer.

2. The process according to claim 1, wherein the supported metallocene catalyst is a bridged bis-indenyl catalyst, a bridged bis-tetrahydrogenated indenyl catalyst, or a bridged bis-indenyl catalyst and a bridged bis-tetrahydrogenated indenyl catalyst.

3. The process according to claim 1, wherein the supported metallocene catalyst is a compound of formula (I) or (II):

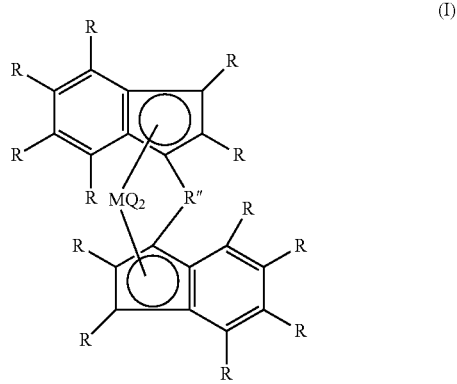

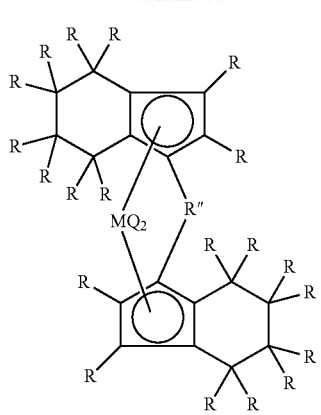

(II)

wherein each R is the same or different and is selected independently from hydrogen or XR'v in which X is chosen from Group 14 of the Periodic Table, oxygen or nitrogen and each R' is the same or different and is chosen from hydrogen or a hydrocarbyl of from 1 to 20 carbon atoms and v+1 is the valence of X; wherein R" is a structural bridge between the two indenyl or tetrahydrogenated indenyls that comprises a $C_1$-$C_4$ alkylene radical, a dialkyl germanium, silicon or siloxane, or an alkyl phosphine or amine radical; wherein Q is a hydrocarbyl radical having from 1 to 20 carbon atoms or a halogen; and wherein M is a transition metal Group 4 of the Periodic Table or vanadium.

4. The process according to claim 1, wherein the supported metallocene catalyst comprises a bridged unsubstituted bis-indenyl, a bridged unsubstituted bis-tetrahydrogenated indenyl, or a bridged unsubstituted bis-indenyl and a bridged unsubstituted bis-tetrahydrogenated indenyl.

5. The process according to claim 1, wherein the supported metallocene catalyst comprises a bridged unsubstituted bis-tetrahydrogenated indenyl.

6. The process according to claim 1, wherein the supported metallocene catalyst comprises ethylene-bis(tetrahydroindenyl)zirconium dichloride or ethylene-bis(tetrahydroindenyl)zirconium difluoride.

7. The process according to claim 1, wherein the at least one supported metallocene catalyst has a particle size distribution of a span value lower than 1.9.

8. The process according to claim 1, wherein the at least one supported metallocene catalyst has a D50 ranging of from 5 μm to 15 μm.

9. The process according to claim 1, wherein said process further comprises a prepolymerization step comprising contacting ethylene with the supported metallocene catalyst.

10. The process according to claim 1, wherein the polyethylene resin has a bimodal molecular weight distribution.

11. The process according to claim 3, wherein R is a hydrogen, methyl, ethyl, n-propyl, iso-propyl, n-butyl, tert-butyl group.

12. The process according to claim 3, Q is F, Cl, or Br.

13. The process according to claim 1, wherein the at least one supported metallocene catalyst has a particle size distribution of a span value lower than 1.5.

14. The process according to claim 1, wherein the at least one supported metallocene catalyst has a particle size distribution of a span value lower than 1.0.

15. The process according to claim 1, wherein the at least one supported metallocene catalyst has a particle size distribution of a span value lower than 0.9.

16. The process according to claim 1, wherein the at least one supported metallocene catalyst has a D50 ranging of from 7.5 μm to 15 μm.

17. A process comprising:
polymerizing ethylene in at least two loop slurry reactors connected in series in the presence of a supported metallocene catalyst and a diluent, and obtaining a polyethylene resin having a multimodal molecular weight distribution;
wherein the supported metallocene catalyst has a particle size distribution of a span value lower than 2.5 and a D50 value within the range of from 5 μm to 20 μm, wherein the span is defined as:

$$\text{span} = \frac{D90 - D10}{D50};$$

with D90 being defined as the particle size for which ninety percent by weight of the particles has a size lower than the D90;
with D10 being defined as the particle size for which ten percent by weight of the particles has a size lower than the D10;
with D50 being defined as the particle size for which fifty percent by weight of the particles has a size lower than the D50; and
with the D90, D10 and D50 being measured by laser diffraction analysis on a Malvern type analyzer.

18. The process of claim 17, wherein the supported metallocene catalyst comprises a porous silica support.

19. The process of claim 18, wherein the porous silica support has a pore volume of between 1 and 4 ml/g.

20. The process of claim 18, wherein the porous silica support has an average pore diameter of between 75 and 300 angstroms.

* * * * *